US007685621B2

(12) United States Patent
Matsuo (10) Patent No.: US 7,685,621 B2
(45) Date of Patent: Mar. 23, 2010

(54) DIGITAL TELEVISION BROADCAST SIGNAL RECEIVER

(75) Inventor: Masahiro Matsuo, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1096 days.

(21) Appl. No.: 11/126,140

(22) Filed: May 11, 2005

(65) Prior Publication Data

US 2005/0264700 A1 Dec. 1, 2005

(30) Foreign Application Priority Data

May 11, 2004 (JP) ............................. 2004-140886

(51) Int. Cl.
*H04N 7/20* (2006.01)
*H04N 5/50* (2006.01)
(52) U.S. Cl. ............................. 725/72; 725/38; 348/731
(58) Field of Classification Search .................... 725/72
See application file for complete search history.

(56) References Cited

U.S. PATENT DOCUMENTS

| | | | |
|---|---|---|---|
| 5,955,988 A * | 9/1999 | Blonstein et al. ............ 342/359 |
| 6,216,266 B1 * | 4/2001 | Eastman et al. ............... 725/72 |
| 6,580,452 B1 * | 6/2003 | Gangitano ................... 348/180 |
| 6,693,587 B1 * | 2/2004 | Kuether et al. .............. 342/359 |
| 6,697,610 B1 * | 2/2004 | Tait ......................... 455/277.1 |
| 6,982,745 B2 * | 1/2006 | Miyabayashi ............... 348/193 |
| 7,266,155 B2 * | 9/2007 | Jaffe et al. .................. 375/260 |
| 7,275,254 B1 * | 9/2007 | Jutzi ........................... 725/72 |
| 7,505,089 B2 * | 3/2009 | Borseth ...................... 348/731 |
| 2003/0145328 A1 * | 7/2003 | Rabinowitz et al. .......... 725/72 |
| 2004/0128689 A1 * | 7/2004 | Pugel et al. .................... 725/72 |
| 2005/0174966 A1 * | 8/2005 | Lansford et al. ............. 370/329 |
| 2006/0018288 A1 * | 1/2006 | Luo et al. .................... 370/334 |
| 2007/0044125 A1 * | 2/2007 | Lee ............................ 725/72 |

FOREIGN PATENT DOCUMENTS

| | | |
|---|---|---|
| JP | 2000-068877 | 3/2000 |
| JP | 2000-299655 | 10/2000 |
| JP | 2001-298674 | 10/2001 |
| JP | 2003-101897 | 4/2003 |
| JP | 2004-128927 | 4/2004 |

OTHER PUBLICATIONS

Office Action in Japanese Patent Application No. 2004-140886 dated Nov. 17, 2009.

* cited by examiner

*Primary Examiner*—Brian T Pendleton
*Assistant Examiner*—Pinkal Chokshi
(74) *Attorney, Agent, or Firm*—Crowell & Moring LLP (57) ABSTRACT

In a digital TV broadcast signal receiver connected to a multi-directional antenna called smart antenna, a time necessary for deciding an optimum signal receiving direction of each receivable channel is shortened with using local information relating to a location of the multi-directional antenna and information of TV towers including location information of TV towers and channel information of channels, TV broadcast signals of which are transmitted from each TV tower. When the local information is inputted, the digital TV broadcast signal receiver identifies at least one TV tower and selects a channel based on the channel information. An optimum signal receiving direction of the selected channel are decided as the optimum signal receiving directions of all the channels transmitted from the same TV tower.

6 Claims, 5 Drawing Sheets

| TV TOWER A | TV TOWER B | TV TOWER C | TV TOWER D |
|---|---|---|---|
| N ○○<br>W △△△ | N ○△<br>W △□○ | N ○□<br>W △△□ | N ○△<br>W △△○ |
| 2 c h | 6 c h | 4 c h | 2 c h |
| 1 3 c h | 1 9 c h | 8 c h | 8 c h |
| 1 8 c h | 4 6 c h | 2 6 c h | 1 9 c h |
| ⋮ | ⋮ | ⋮ | ⋮ |

31 — (first data row)
32 — (channel rows)

FIG. 5

DIGITAL TELEVISION BROADCAST SIGNAL RECEIVER

BACKGROUND OF THE INVENTION

1. Field of the Invention

The present invention relates to a digital television (IV) broadcast signal receiver that can receive digital television broadcast signals such as ATSC (Advanced television systems Committee).

2. Description of the Related Art

In the North American Continent where an ATSC digital television broadcast (it is abbreviated to a hereinafter TV broadcast) is performed, plains are dotted with metropolises, so that various TV broadcast signals broadcasted in the suburbs of each metropolis can be received at other cities or the halfway point of the cities. In consideration from a user who receives the TV broadcast signals, since many TV broadcast signals are transmitted in various directions, it is necessary to regulate a direction of an antenna in an orientation to a TV broadcasting station from which a program which he wants to watch is delivered. Therefore, a multi-directional antenna such as a smart antenna is put into practical use.

According to the EIA-909 technical standard, it is provided that a smart antenna has sixteen signal receiving directions in respective directions where a circle is divided into sixteen. A digital TV broadcast signal receiver in compliance with the EIA-909 technical standard can switch an effective signal receiving direction of the multi-directional antenna such as the smart antenna to one of all the sixteen signal receiving directions.

Among such digital TV broadcast signal receivers, there is a product having an automatic scanning function for selecting a signal receiving direction of a multi-directional antenna at which a digital TV broadcast signal of a channel chosen by a user in a most suitable condition. In the digital TV broadcast signal receiver having the automatic scanning function, it scans sixteen signal receiving directions with respect to each channel, and sets a direction at which the digital TV broadcast signal can be received in the most suitable condition as an optimum signal receiving direction of each channel.

In such a conventional digital TV broadcast signal receiver, signal receiving conditions of each receivable channel are confirmed in all signal receiving directions of the multi-directional antenna, and the optimum signal receiving direction of each receivable channel is decided, so that it needs a long term for deciding the optimum signal receiving directions of all the receivable channel.

With respect to an apparatus for controlling a signal receiving direction of a multi-directional antenna, for example, Japanese Laid-Open Patent Publication No. 2000-68877 shows an apparatus for controlling a signal receiving direction of an antenna to an optimum signal receiving direction automatically to one of a plurality of broadcast satellites based on information of location of the antenna and information of stationary orbits of the broadcast satellites. Such a conventional signal receiver automatically controls the signal receiving direction of the antenna to a stationary orbit location of the broadcasting satellite, so that satellite broadcast signal can be received corresponding to a channel chosen by the user without bothering a hand of the user. If such a conventional digital TV broadcast signal receiver is used for receiving ground wave digital TV broadcast signal, a signal receiving direction of the antenna to a TV broadcast signal transmission tower (hereinafter, abbreviated as TV tower) will be varied corresponding to a location of the antenna. Furthermore, a ground wave TV broadcast signal is easily affected by multi-path due to megastructure. Thus, it is impossible to shorted a time necessary for deciding an optimum signal receiving direction of each receivable channel.

In addition, for example, Japanese Laid-Open Patent Publication No. 2000-68877 shows an apparatus automatically presetting frequency of receivable channels corresponding to location of the apparatus utilizing information with respect to location of the apparatus. According to utilizing the information of location of the apparatus, optimum signal receiving condition can automatically be set. Such a conventional apparatus, however, has no function for adjusting a direction of an antenna.

SUMMARY OF THE INVENTION

A purpose of the present invention is to provide a digital TV broadcast signal receiver, by which a term necessary for deciding an optimum signal receiving direction of each receivable channel can be shortened, when a multi-directional antenna is connected thereto.

A digital TV broadcast signal receiver in accordance with an aspect of the present invention is connected to a multi-directional antenna having a predetermined number of signal receiving directions in compliance with a predetermined technical standard, receiving a digital TV broadcast signal by making only one signal receiving direction among the predetermined number of signal receiving directions effective.

The digital TV broadcast signal receiver comprises: a tuner for receiving a TV broadcast signal through the multi-directional antenna; a wireless remote controller operated by a user for inputting at least local information relating to a location of the multi-directional antenna; a memory for memorizing at least information of TV towers including location information relating to location of at least one TV tower existed in an area where digitized terrestrial broadcast is performed and channel information relating to at least one channel, TV broadcast signal of which is transmitted from the TV tower; and a controller for switching an effective signal receiving direction of the multi-directional antenna, measuring a signal receiving condition of a TV broadcast signal received by the tuner, and comparing a plurality of signal receiving conditions.

When a multi-directional antenna is connected to the tuner and the location information is inputted by the user, the controller identifies an area based on the local information and at least one TV tower in the area based on the information of the TV towers and the local information. The controller decides an optimum signal receiving direction of a channel among the at least one channel based of the signal receiving condition, and memorizes the optimum signal receiving direction in the memory as the optimum signal receiving direction of all of the at least one channel.

In general, it is possible to regard that signal receiving conditions of a plurality of channels, TV broadcasting signals of which are transmitted from the same TV tower are substantially the same. Thus, it is sufficient that only one optimum signal receiving direction is decided with respect to these channels. By such a configuration, an area and at least one TV tower which transmits digital TV broadcast signals in the area is identified by the local information and the information of TV towers. Then, the optimum signal receiving direction of one channel among at least one channel (preferably more than two channels), TV broadcast signals of which are transmitted from the identified TV tower, is decided as the optimum signal receiving directions of the channels. In other words, the optimum signal receiving directions of a group of channels with respect to each TV tower can be decided in one scanning operation for deciding an optimum signal receiving of a channel, so that it is possible to shorten a time necessary for deciding the optimum signal receiving directions of the receivable channels, largely. Since the optimum signal receiving direction of each group of channels is memorized is decided and memorized in the memory when the local information is inputted by a user, it is possible to switch the effective signal receiving direction of the multi-directional antenna to an optimum signal receiving direction of a channel chosen by the user so as to receive a TV broadcast signal of the channel.

It is possible that a modem connected to a server for managing information of TV towers via a communication line, and the controller downloads the latest information of the TV tower at a predetermined term via the modem for updating the information of TV towers memorized in the memory.

By such a configuration, the information of TV towers memorized in the memory can be updated. If the channels, TV broadcast signals of which are transmitted from any TV tower, are altered, the digital TV broadcast signal receiver can alter the optimum signal receiving direction of the channels based on the updated information of TV towers automatically at a predetermined term through the modem.

Furthermore, it is possible that the controller measures an sensitivity of a television broadcast signal in each signal receiving direction, compares values of measured sensitivities with each other, and decides a direction in which the value of the measured sensitivity is highest as an optimum signal receiving direction of the channel.

Alternatively, it is possible that the controller takes an image data from the television broadcast signal received by the tuner and performs a predetermined signal processing to the image data, compares bit error rate of the processed image data, and decides a signal receiving direction, in which a value of the bit error rate is smallest as the optimum signal receiving direction of the channel.

DETAILED DESCRIPTION OF THE EMBODIMENT

Figure 1:
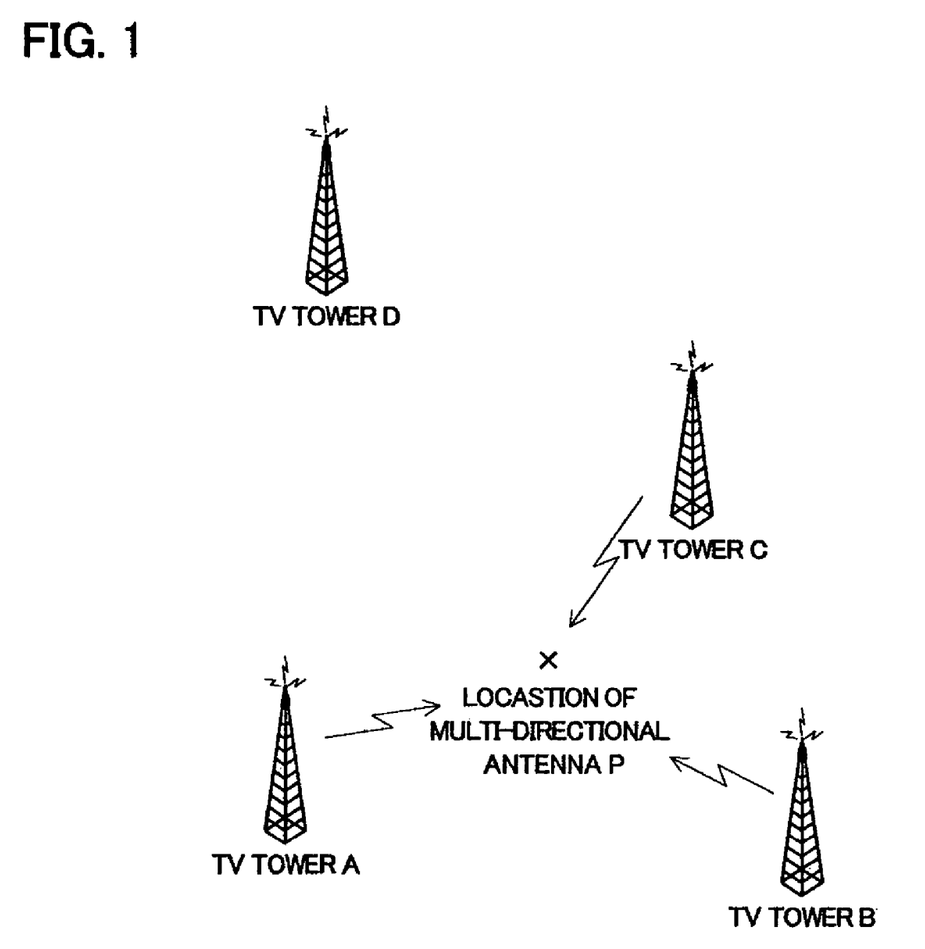
FIG. 1 is a conceptual diagram showing a circumstance for receiving digital television (TV) broadcast signals in home.

A digital TV broadcast signal receiver in accordance with an embodiment of the present invention is described with reference to figures. A circumstance for receiving TV broadcast signals in home is shown in FIG. 1. In an area where grand-based digital TV broadcast is performed, when a sensitivity of received signal of a TV broadcast signal is equal to or larger than a predetermined threshold value, an image having a predetermined image quality can be obtained by correction. Thus, it is possible to receive various digital TV broadcast signals transmitted from various TV towers A, B, C, and so on at a location P of a multi-directional antenna, so that TV programs of the receivable channel can be viewed. In correspondence with such a circumstance, a multi-directional antenna having a plurality of signal receiving directions called smart antenna is put into practical use. Besides, it is assumed that a TV tower D in FIG. 1 transmits no digital TV broadcast signal.

There are various types of the multi-directional antenna, for example, for rotating an antenna for changing an effective signal receiving direction, or having a plurality of sub-antennas corresponding to the signal receiving directions and electric switches, and switching the electric switches on and off for selecting one sub-antenna as the effective signal receiving direction. Furthermore, a number of signal receiving directions is defined as sixteen according to the EIA-909 technical standard, but there are simplified multi-directional antennas having four or eight signal receiving directions in consideration with user's needs or cost.

Figure 2:
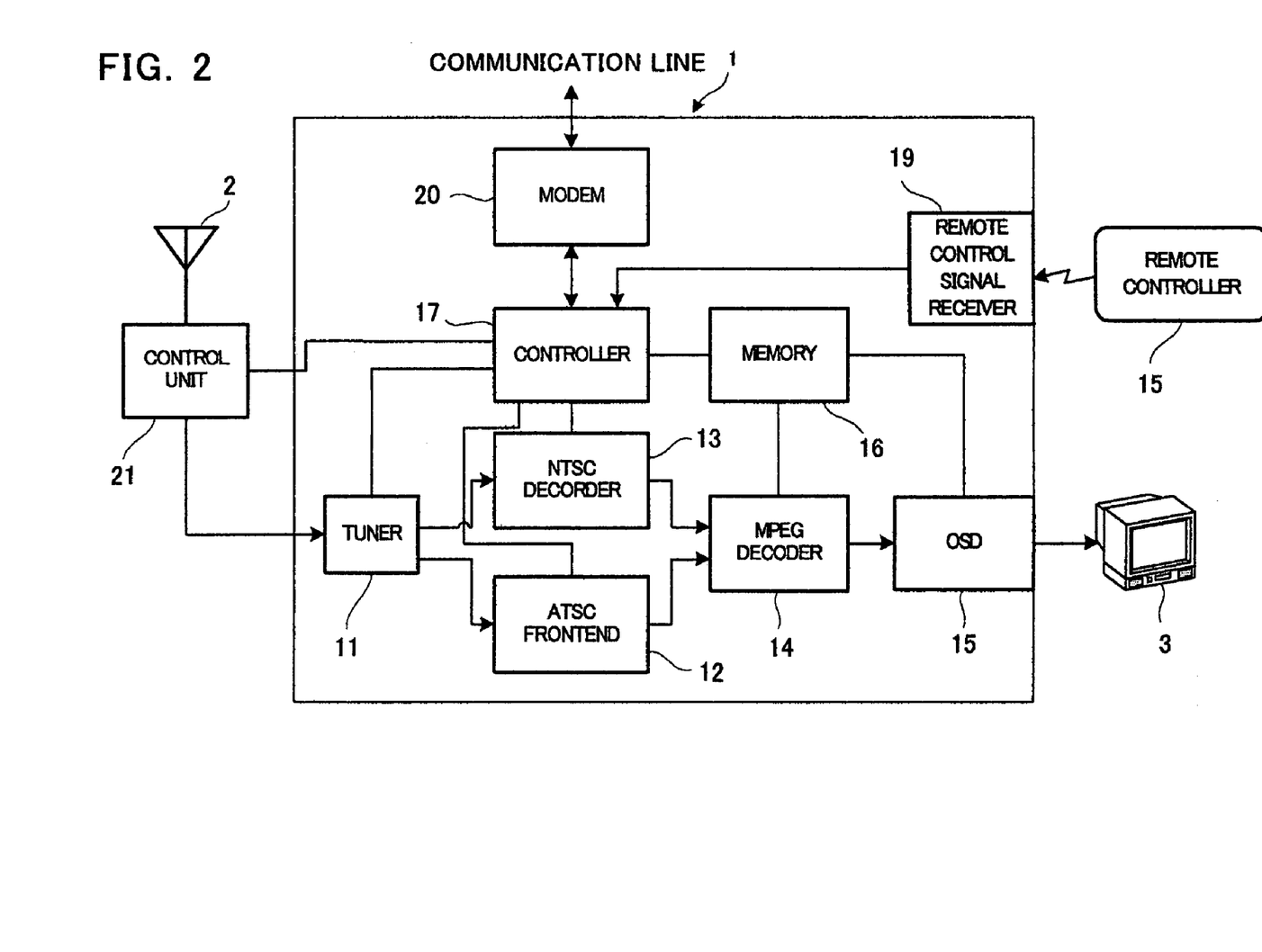
FIG. 2 is a block diagram showing a configuration of a digital TV broadcast signal receiver in accordance with an embodiment of the present invention.

A configuration of a digital TV broadcast signal receiver 1 in accordance with this embodiment is shown in FIG. 2. The digital TV broadcast signal receiver 1 comprises a tuner 11 connected to a multi-directional antenna 2, an ATSC front end 12, an NTSC decoder 13, an MPEG decoder 14, an onscreen display unit (OSD) 15, a memory 16, a controller (CPU) 17, a wireless remote controller 18, a wireless remote control signal receiver 19 and a modem 20.

The tuner 11 serves as a broadcast signal receiving means for selecting and receiving a TV broadcast signal of an appointed frequency, modulating the received TV broadcast signal, sensing a BER (Bit Error Rate) value of the received TV broadcast signal, and performing an error correction processing to the received TV broadcast signal.

The ATSC front end 12 performs a predetermined signal processing to a digital TV broadcast signal received with the tuner 11, and decodes the digital TV broadcast signal. The NTSC decoder 13 decodes an analog TV broadcast signal received with the tuner 11. The MPEG decoder 14 decodes MPEG compressed digital TV broadcast signal. The digital TV broadcast signaling decoded by the MPEG decoder 14 is outputted to the monitor display apparatus 3 through the onscreen display unit 15 and an image is displayed on a screen of the monitor display apparatus 3. The onscreen display unit 15 superimposes a signal of predetermined display image on the decoded digital TV broadcast signal.

The memory 16 serves as a memory means for memorizing TV tower information including location information of each TV tower existed in each area and channel information relating to channels, TV broadcast signals of which are transmitted from each TV tower. The memory 16 further memorizes an optimum signal receiving direction of each channel which can be received with the digital TV broadcast signal receiver 1. In addition, the memory 16 further memorizes decoded digital TV broadcast signal temporarily, and the data of the display image superimposed on the digital TV broadcast signal.

The controller 17 serves as a control signal output means for sensing signal receiving condition of a digital TV broadcast signal received with the tuner 11, and outputting a control signal to a control unit 21 of the multi-directional antenna 2 so as to control the effective signal receiving direction of the multi-directional antenna. The controller 17 further serves a signal receiving direction deciding means for continuously receiving digital TV broadcast signals of receivable channels in all signal receiving directions of the multi-directional antenna 2, and deciding an optimum signal receiving direction of each receivable channel based on intensities of received digital TV broadcast signals. Still furthermore, the controller 17 serves as updating means for updating TV tower information memorized in the memory 16 by receiving new TV tower information through the modem 20. In addition, the controller 17 controls the entire of the digital TV broadcast signal receiver 1, such as the ATSC front end 12, the NTSC decoder 13, and so on.

The wireless remote controller 18 comprises a plurality of numeric keys (a numbered keyboard), cursor keys (an arrow pads) a decision key, and so on, which are operated by a user, and transmits a signal corresponding to key operation to the wireless remote control signal receiver 19. The wireless remote controller 18 is used by a user for inputting local information with respect to the location of the multi-directional antenna 2, and serves as a local information input means. The local information is not limited especially, when it relates to information by which the location of the multi-directional antenna can be identified. For example, postal code or telephone numbering can be used as local information. The wireless remote control signal receiver 19 receives a signal from the wireless remote controller 18 and transmits the signal to the controller 17.

The modem 20 serving as a communication means is connected to a server (not shown) for managing information of TV towers via a communication line, and the controller 17 downloads the latest information of the TV tower at a predetermined term for updating the information of TV towers memorized in the memory 16.

The control unit 21 of the multi-directional antenna 2 males one signal receiving direction among a plurality of signal receiving directions of the multi-directional antenna 2 effective, which is directed by a control signal from the controller 17. When the multi-directional antenna 2 is a type of rotating the antenna for changing the effective signal receiving direction with a motor, the control unit 21 controls the rotation of the motor so that the direction of the antenna in the directed direction. Alternatively, when the multi-directional antenna 2 is a type of switching the electric switches on and off for switching the effective signal receiving direction, the control unit 21 switches on only one electric switch corresponding to the directed direction and off the rests.

Figure 3:
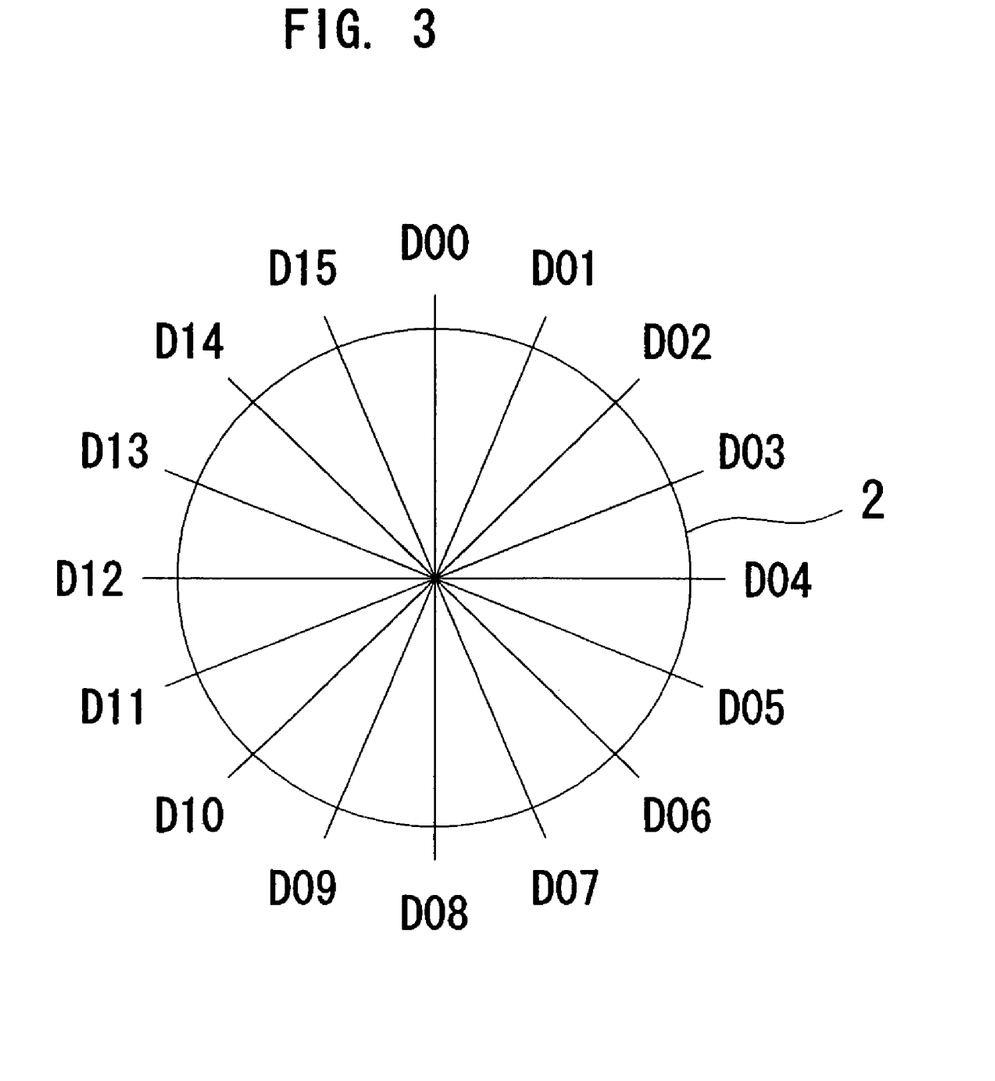
FIG. 3 is a conceptual diagram showing an example of signal receiving directions of a multi-directional antenna connected to the digital TV broadcast signal receiver.

FIG. 3 shows the signal receiving directions of the multi-directional antenna 2. When the digital TV broadcast signal receiver 1 in accordance with this embodiment is connected to such a multi-directional antenna 2, it receives a digital TV broadcast signal of each receivable channel in each of sixteen signal receiving directions D00 to D15 defined in the technical standard, and measures signal receiving condition with respect to each receivable channel.

Figure 4:
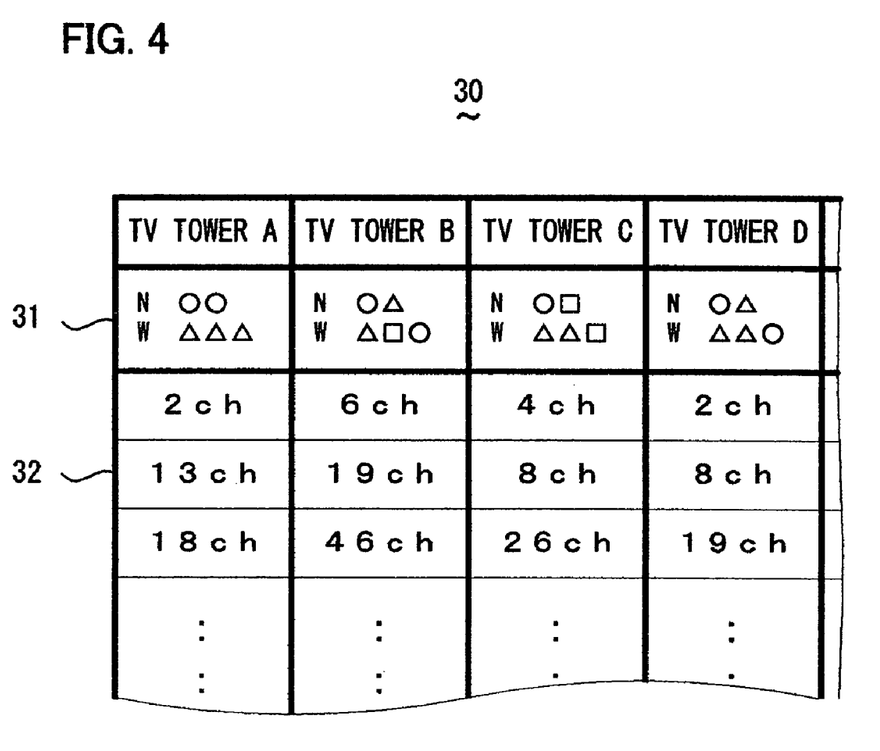
FIG. 4 is a conceptual drawing showing an example of information with respect to TV towers memorized in a memory of the digital TV broadcast signal receiver.

Subsequently, the information of TV towers 30 is described with reference to FIG. 4. The information of TV towers 30 includes location information 31 of each TV tower existed in each area, and channel information 32 with respect to channels which can be transmitted from each TV tower. In FIG. 4, it is only show examples of TV towers of A to D, but others are omitted. The location information 31 is configured by, for example, information relating to latitude and longitude of locations where the TV towers A to D are built. The channel information 32 includes information relating to a plurality of channels (a group of channels) transmitted from each TV tower A to D. In FIG. 4, it is shown that the TV tower A transmits TV broadcast signals of second channel, thirteenth channel and eighteenth channel (hereinafter, abbreviated as 2-ch, 13-ch and 18-ch, and so on).

Figure 5:
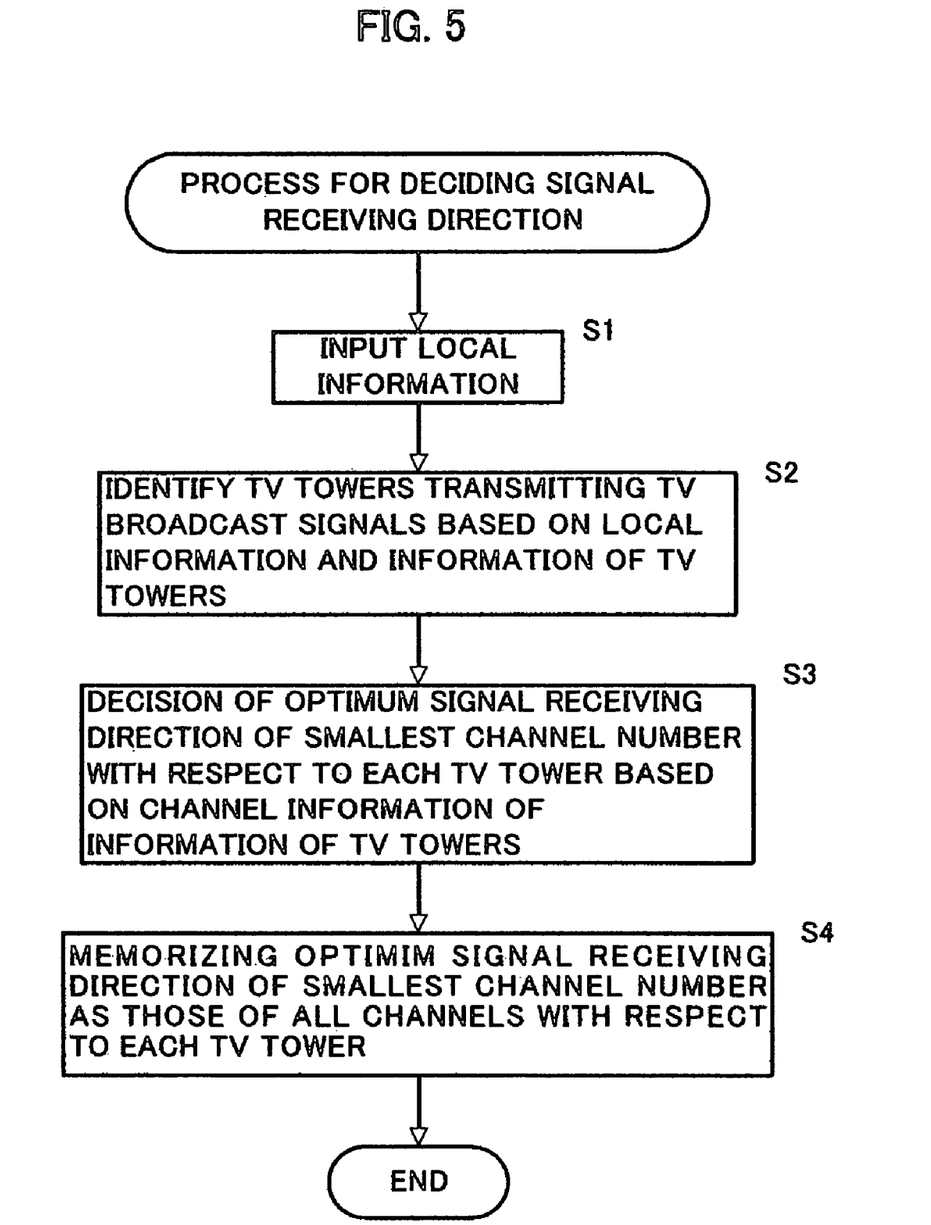
FIG. 5 is a flowchart showing a process for deciding effective signal receiving direction of the digital TV broadcast signal receiver.

Subsequently, a process for deciding an effective signal receiving direction of the digital TV broadcast signal receiver 1 by the controller 17 is described with reference to a flowchart shown in FIG. 5 as well as FIG. 4. When the multi-directional antenna 2 is connected to the digital TV broadcast signal receiver 1 and local information is inputted by a user (S1), the digital TV broadcast signal receiver 1 identifies at least a TV tower which transmits digital TV broadcast signal in an area identified by the local information based on the local information and the location information 31 of the information of TV towers 30 memorized in the memory 16 (S2). In the example shown in FIGS. 1 and 4, the TV towers A, B and C are identified in the steps S1 and S2, since the digital TV broadcast signals transmitted from these TV towers can be reached to the position P of the multi-directional antenna 2.

Subsequently, the digital TV broadcast signal receiver 1 decides an optimum signal receiving direction with respect to a channel having the smallest channel number among the group of channels transmitted from each TV tower based on the channel information 32 of the information of TV towers 30 (S3). Besides, the channel selected among the group of channels in the step S3 is not necessarily the channel having the smallest channel number. It is possible that one optional channel is selected among the group of channels. The optimum signal receiving direction of each channel is decided that the TV broadcast signal is received in each of the signal receiving directions D00 to D15 while the effective signal receiving direction of the multi-directional antenna 2 is serially scanned in there sixteen directions, and intensities of received TV broadcast signals are compared. For example, a signal receiving direction showing the highest sensitivity of the TV broadcast signal of an optional channel is decided as the optimum signal receiving direction of the channel. In the example shown in FIGS. 1 and 3, the digital TV broadcast signal receiver 1 decides the optimum signal receiving direction of 2-ch with respect to the TV tower A. Similarly, the optimum signal receiving directions of 6-ch and 4-ch are respectively decided with respect to the TV towers B and C. Each of the optimum signal receiving directions decided as above are memorized as the optimum signal receiving direction with respect to all channels transmitted from the same TV tower (S4). In the example shown in FIGS. 1 and 3, the optimum signal receiving direction of 2-ch is memorized as the optimum signal receiving direction of other channels (13-ch, 18-ch, and so on). The same goes for the TV towers B, C, and so on.

When a channel is chosen by a user, the optimum signal receiving direction of the channel is read out from the memory 16, and a control signal corresponding to the optimum signal receiving direction is outputted to the control unit 21 of the multi-directional antenna 2 from the controller 17.

According to the digital TV broadcast signal receiver 1 of the embodiment, an area and at least one TV tower which transmits digital TV broadcast signals in the area is identified by the local information and the information of TV towers 30. Then, the optimum signal receiving direction of one channel among the group of channels, TV broadcast signals of which are transmitted from the identified TV tower, is decided as the optimum signal receiving directions of the group of the channels. In other words, the optimum signal receiving directions of the group of channels with respect to each TV tower can be decided in one scanning operation for deciding an optimum signal receiving of a channel, so that it is possible to shorten a time necessary for deciding the optimum signal receiving directions of the receivable channels, largely. Since the optimum signal receiving direction of each group of channels is memorized is decided and memorized in the memory 16 when the local information is inputted by a user, it is possible to switch the effective signal receiving direction of the multi-directional antenna 2 to an optimum signal receiving direction of a channel chosen by the user so as to receive a TV broadcast signal of the channel. Furthermore, the information of TV towers 30 memorized in the memory 16 can be updated, when the user inputs the local information. If the channels, TV broadcast signals of which are transmitted from any TV tower, are altered, the digital TV broadcast signal receiver 1 can alter the optimum signal receiving direction of the channels based on the updated information of TV towers 30. In addition, it is possible to update the information of TV towers 30 automatically at a predetermined term through the modem 20.

The present invention is not limited to the description and illustration of the embodiment. It is possible to modify the configuration of the digital TV broadcast signal receiver in various states. For example, the optimum signal receiving direction of each channel is decided by not only the highest sensitivity of TV broadcast signal, but also a value of BER (Bit Error Rate) sensed by the tuner 11. For example, the controller 17 takes an image data from the television broadcast signal received by the tuner 11 and performs a predetermined signal processing to the image data, compares bit error rate of the processed image data, and decides a signal receiving direction, in which a value of the bit error rate is smallest as the optimum signal receiving direction of the channel.

This application is based on Japanese patent application 2004-140886 filed May 11, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital television broadcast signal receiver connected to a multi-directional antenna having a predetermined number of signal receiving directions in compliance with a predetermined technical standard, receiving a digital television broadcast signal by making only one signal receiving direction among the predetermined number of signal receiving directions effective, comprising:
    a tuner for receiving a television broadcast signal through the multi-directional antenna;
    a wireless remote controller operated by a user for inputting at least local information relating to a location of the multi-directional antenna;
    a memory for memorizing at least information of television broadcast signal transmission towers (abbreviated as TV tower) including location information relating to location of at least one TV tower existed in an area where digitized terrestrial broadcast is performed and channel information relating to at least one channel, television broadcast signal of which is transmitted from the TV tower;
    a controller for switching an effective signal receiving direction of the multi-directional antenna, measuring a signal receiving condition of a television broadcast signal received by the tuner, and comparing a plurality of signal receiving conditions; and wherein
    when a multi-directional antenna is connected to the tuner and the location information is inputted by the user, the controller identifies an area based on the local information and at least one TV tower in the area based on the information of the TV towers and the local information;
    the controller decides an optimum signal receiving direction of a channel having a smallest channel number among a group of channels transmitted from each TV tower as an optimum signal receiving direction of the group of channels, based on the signal receiving condition of the channel having the smallest channel number, and memorizes the optimum signal receiving direction in the memory as the optimum signal receiving direction of all of the group of channels.

2. The digital television broadcast signal receiver in accordance with claim 1, further comprising:
    a modem connected to a server for managing information of TV towers via a communication line; and wherein
    the controller downloads a latest information of the TV tower at a predetermined term via the modem for updating the information of TV towers memorized in the memory.

3. The digital television broadcast signal receiver in accordance with claim 1, wherein
    the controller measures an sensitivity of a television broadcast signal in each signal receiving direction, compares values of measured sensitivities with each other, and decides a direction in which the value of the measured sensitivity is highest as an optimum signal receiving direction of the channel.

4. The digital television broadcast signal receiver in accordance with claim 1, wherein
    the controller takes an image data from the television broadcast signal received by the tuner and performs a predetermined signal processing to the image data, compares bit error rate of the processed image data, and decides a signal receiving direction, in which a value of the bit error rate is smallest as the optimum signal receiving direction of the channel.

5. A digital television broadcast signal receiver connected to a multi-directional antenna having a plurality of signal receiving directions in compliance with a predetermined technical standard, receiving a digital television broadcast signal by making only one signal receiving direction among a plurality of the signal receiving directions effective, comprising:
    a control signal output means for outputting a control signal for switching an effective signal receiving direction to the multi-directional antenna so as to receive a television broadcast signal;
    a television broadcast signal receiving means connected to the multi-directional antenna and receiving a digital television broadcast signal via the multi-directional antenna;
    a signal receiving direction deciding means for deciding an optimum signal receiving direction with respect to each receivable channel with using the data memorized in the memory means;
    a memory means for memorizing at least an optimum signal receiving direction of each channel and information of television broadcast signal transmission towers (abbreviated as TV tower) including location information of each TV tower existed in each area and channel information relating to channels, television broadcast signals of which are transmitted from each TV tower;
    an information input means used by a user for inputting at least local information relating to location of the multi-directional antenna; and wherein
    when the local information is inputted by the user through the information input means,
    the signal receiving direction deciding means identifies at least one TV tower in an area based on the local information, selects a channel among at least one channel, a television broadcast signal of which is transmitted from each identified TV tower based on the channel information of the information of TV towers; and decides an optimum signal receiving direction of a channel having a smallest channel number among a group of channels transmitted from each TV tower as an optimum signal receiving direction of the group of channels, based on the signal receiving condition of the channel having the smallest channel number; and the memory means memorizes each optimum signal receiving direction of the group of channels of each TV tower.

6. The digital television broadcast signal receiver in accordance with claim 5, further comprising:

a communication means connected to a server for managing information of TV towers; and wherein the signal receiving direction deciding means downloads a latest information of the TV towers at a predetermined term via the communication means for updating the information of TV towers memorized in the memory means.

* * * * *